United States Patent
Negishi

(10) Patent No.: US 8,159,570 B2
(45) Date of Patent: Apr. 17, 2012

(54) IMAGE SENSING APPARATUS AND CONTROL METHOD FOR THE IMAGE SENSING APPARATUS

(75) Inventor: Norio Negishi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 12/504,376

(22) Filed: Jul. 16, 2009

(65) Prior Publication Data

US 2010/0013964 A1    Jan. 21, 2010

(30) Foreign Application Priority Data

Jul. 18, 2008  (JP) .................................. 2008-187909

(51) Int. Cl.
*H04N 9/64* (2006.01)
(52) U.S. Cl. ........................ 348/247; 348/322
(58) Field of Classification Search ........................ None
See application file for complete search history.

(56) References Cited

U.S. PATENT DOCUMENTS

| | | | | |
|---|---|---|---|---|
| 6,002,433 A * | 12/1999 | Watanabe et al. | ............. | 348/246 |
| 2003/0151673 A1* | 8/2003 | Hashimoto et al. | ........ | 348/220.1 |
| 2006/0007331 A1* | 1/2006 | Izumi et al. | ................... | 348/246 |
| 2006/0180741 A1* | 8/2006 | Agranov et al. | ........... | 250/208.1 |
| 2008/0117318 A1* | 5/2008 | Aoki | ............................. | 348/246 |

FOREIGN PATENT DOCUMENTS

JP  2003-037781 A  2/2003

* cited by examiner

*Primary Examiner* — Lin Ye
*Assistant Examiner* — Dennis Hogue
(74) *Attorney, Agent, or Firm* — Carter, DeLuca, Farrell & Schmidt LLP

(57) ABSTRACT

An image sensing apparatus includes an image sensor including a pixel array, on which a plurality of pixels are arranged, and a reading section configured to read a signal from the pixel array, a detection unit configured to detect a defective pixel in the pixel array based on a signal read from the pixel array by the reading section under a condition that the pixel array is shielded from light, and a control unit configured to control the reading section to read a signal from the pixel array under a condition that a defect tends to occur when the detection unit detects the defective pixel.

6 Claims, 14 Drawing Sheets

FIG. 3

| | First Column | Second Column | Third Column |
|---|---|---|---|
| Ninth Row | G | B | G |
| Eighth Row | R | G | R |
| Seventh Row | G | B | G |
| Sixth Row | R | G | R |
| Fifth Row | G | B | G |
| Fourth Row | R | G | R |
| Third Row | G | B | G |
| Second Row | R | G | R |
| First Row | G | B | G |

IMAGE SENSING APPARATUS AND CONTROL METHOD FOR THE IMAGE SENSING APPARATUS

BACKGROUND OF THE INVENTION

1. Field of the Invention

The present invention relates to an image sensing apparatus and a control method for the image sensing apparatus.

2. Description of the Related Art

In image sensing apparatuses, such as digital cameras, image sensors, such as charged-coupled device (CCD) sensors, are often used. In the image sensors, dark current components may be contained in image signals output from a pixel array, in which a plurality of pixels are arranged. If image signals output from pixels include a great amount of dark current components, the quality of an image formed by the image signals deteriorates.

In the pixel array of the image sensor, any pixel that outputs a signal which includes a considerable amount of dark current components is referred to as a defective pixel. Even if defective pixels occur at such a level that several pixels are defective in the entire pixel array of the image sensor, the quality of an image obtained by signals from the pixel array is noticeably impaired. It is considered that defective pixels occur during the manufacture of an image sensor, or after manufacturing, due to radiation of high-energy electromagnetic waves, such as cosmic rays. It is also considered that the defective pixels that have been detected once can be constantly detected at least under the same temperature conditions.

As a countermeasure for defective pixels, a process described below is considered as effective. Specifically, image signals for one frame are output from the pixel array under the same predetermined conditions (same temperature and same accumulation time under the light shielding condition), and a pixel that corresponds to a signal of a predetermined level or higher is detected as a defective pixel from the image signals for the one frame. Then, the signal from the detected defective pixel is interpolated using signals from the surrounding pixels.

Meanwhile, there are also defective pixels at which the signal level of the read signal is either high at one time or low at another time if the signal is read a number of times under the same conditions (same temperature and same accumulation time under the light shielding condition) as when the pixel was detected as a defective pixel. Those defective pixels behave the way they had flicker defects, that is, they act as normal pixels at one time and defective pixels at another time. With regard to this problem, Japanese Patent Application Laid-Open No. 2003-37781 discusses an image sensor in which a pixel containing a flicker defect can be detected using image signals of a plurality of frames.

However, with a method discussed in Japanese Patent Application Laid-Open No. 2003-37781, because image signals of a plurality of frames are acquired, it is necessary to perform a lengthy process of detecting a pixel having a flicker defect and interpolating a signal of the defective pixel (a defective pixel adjusting process). Consequently, the takt time in a camera manufacturing process (the defective pixel adjusting process) may be prolonged, thus increasing production cost.

SUMMARY OF THE INVENTION

The present invention is directed to improving the detection accuracy of pixels including flicker defects and reducing time required to detect pixels including flicker defects.

According to an aspect of the present invention, an image sensing apparatus includes an image sensor including a pixel array, on which a plurality of pixels are arranged, and a reading section configured to read a signal from the pixel array; a detection unit configured to detect a defective pixel in the pixel array based on a signal read from the pixel array by the reading section under a condition that the pixel array is shielded from light; and a control unit configured to control the reading section to read a signal from the pixel array under a condition that a defect tends to occur when the detection unit detects the defective pixel.

According to another aspect of the present invention, there is provided a method for controlling an image sensing apparatus including an image sensor including a pixel array, on which a plurality of pixels are arranged, and a reading section configured to read a signal from the pixel array, and a detection unit configured to detect a defective pixel in the pixel array based on a signal read from the pixel array by the reading section under a condition that the pixel array is shielded from light. The method includes controlling the reading section to read a signal from the pixel array under a condition that a defect tends to occur when the detection unit detects the defective pixel.

According to an exemplary embodiment of the present invention, the detection accuracy in detecting pixels including flicker defects can be improved, and time required to detect pixels including flicker defects can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an array of color filters.

DETAILED DESCRIPTION OF THE EMBODIMENTS

Various exemplary embodiments, features, and aspects of the invention will be described in detail below with reference to the drawings.

Defects that occur in digital cameras can be roughly divided into two types. One type is an inherent defect, which originates in structural defects formed in the manufacture of image sensors. The other type is an acquired defect, which is caused by partial destruction of the image sensors mounted in digital cameras due to radiation of high-energy electromagnetic waves, such as cosmic rays.

Inherent defects can be detected in a defect adjustment step in the manufacturing process of digital cameras. On the other hand, acquired defects can be detected by providing the digital camera with an "automatic adjustment function" for automatic detection of defects during use of a digital camera. This function is activated periodically at timing that does not inhibit the user in using the camera (at startup time or when the power is turned off). On the other hand, flicker defects (pixels with flicker defects) are considered to stochastically occur when electrons trapped at a defect level in the pixels of the image sensor are freed by a trigger, say, by applying an electric field generated when signals are read from the pixels.

Figure 12:
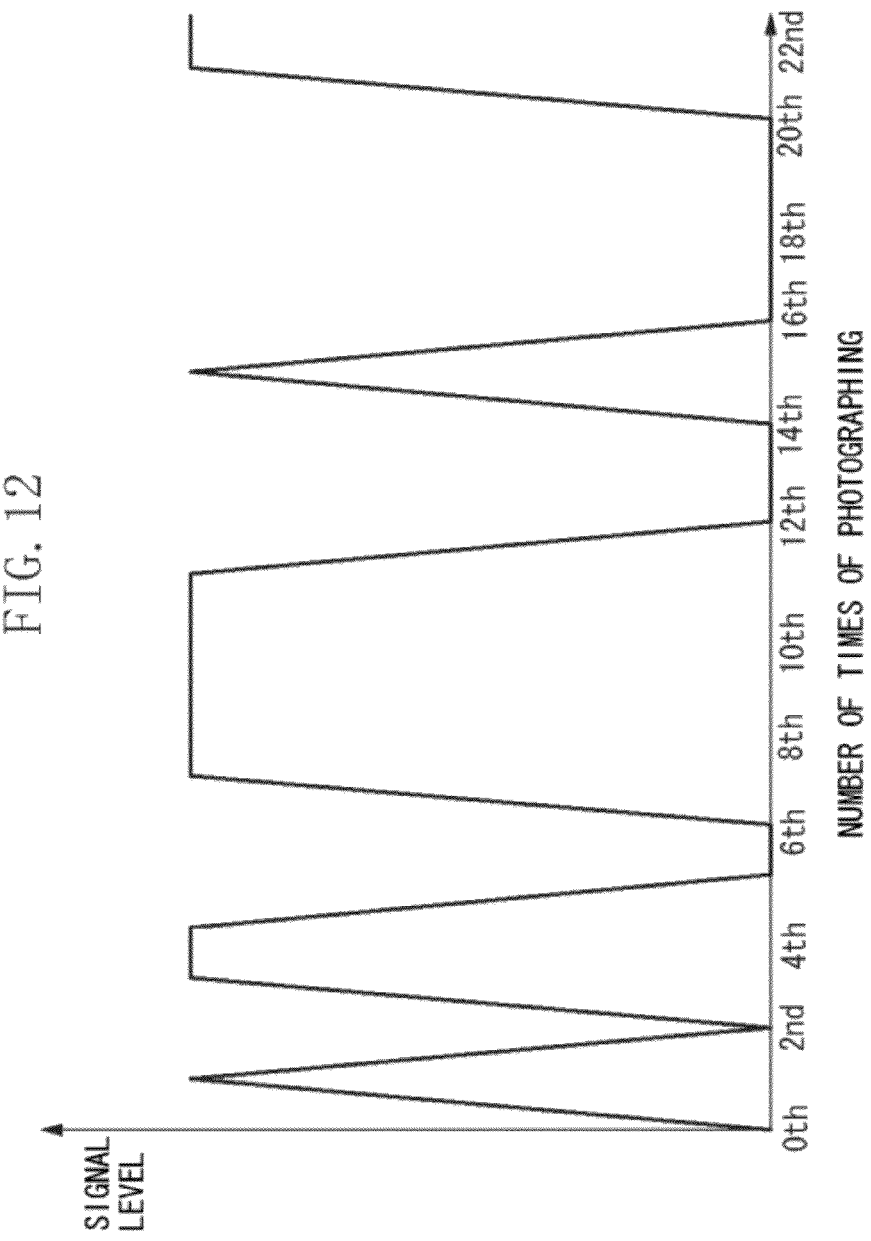
FIG. 12 illustrates an example of changes in the output signal level caused by flicker defects.

An example of the behavior of a flicker defect when a light-shielded image is captured a plurality of times will be described with reference to FIG. 12. In FIG. 12, the horizontal axis indicates the number of times of photographing and the vertical axis indicates signal level. Since a light-shielded image is captured, a signal output from the flicker defect should intrinsically be at a signal level of 0 (or in the neighborhood of 0). However, the signal shows high signal levels at random times, that is, the first, third, and fourth rounds and so on. As illustrated in FIG. 12, the flicker defect behaves like a signal of a normal pixel at some times and behaves like a signal of a defective pixel at other times, with the result that a flicker defect may be overlooked if it is detected only once, thus making secure defect detection and interpolation difficult.

Figure 1:
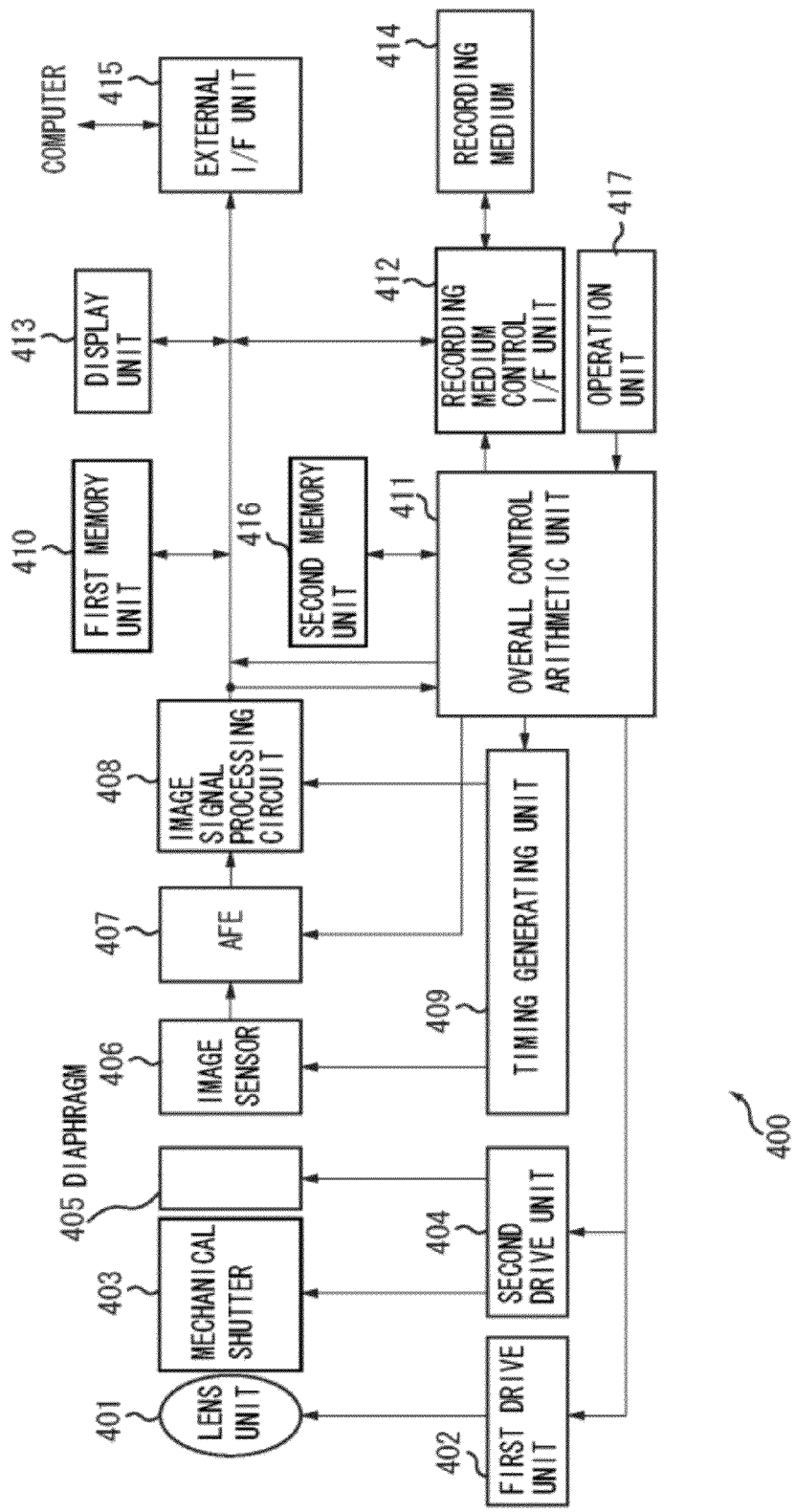
FIG. 1 illustrates a configuration of an image sensing apparatus.

FIG. 1 illustrates a configuration of the image sensing apparatus 400. The image sensing apparatus 400 is a digital camera or a video camera, for example.

A lens 401 refracts incident light to form an image of an object on the pixel array (imaging plane) of an image sensor 406. A first drive unit 402 performs a zoom operation or a focusing operation by driving the lens unit 401. A mechanical shutter 403, which is provided next to the lens unit 401 on the optical path, controls exposure. The mechanical shutter 403 has a function to shield light after exposing the image sensor 406 for a predetermined length of time. The diaphragm 405, which is provided between the lens unit 401 and the image sensor 406 on the optical path, adjusts a quantity of light that has passed through the lens unit 401 and is guided to the image sensor 406.

A second drive unit 404 drives the mechanical shutter 403 to open and close it. The second drive unit 404 also drives the diaphragm 405 to adjust its opening. The image sensor 406 is a charge-coupled device (CCD) sensor, for example, and converts an object image formed on the pixel array into an analog image signal. The image sensor 406 then reads an analog image signal from the image array and outputs the analog image signal.

An analog front end (AFE) 407 receives the analog image signal output from the image sensor 406 and performs a predetermined analog signal process on the received analog image signal to thereby generate a digital image signal. The predetermined analog signal process includes, for example, a correlated double sampling (CDS) process, gain-controlled amplification, and an analog-to-digital (A/D) conversion process. Digital image signals are read as R, G1, G2, and B signals. The AFE 407 supplies the digital image signals of R, G1, G2, and B to an image signal processing circuit 408.

The image signal processing circuit 408 receives digital image signals output from the AFE 407, and performs various arithmetic processes, such as correction and compression, on the received digital image signals to generate image data. The image data is supplied to a first memory unit 410, a display unit 413, an external interface (I/F) unit 415, an overall control arithmetic unit 411, and a recording medium control interface (I/F) unit 412. The first memory unit 410, which is connected to the image signal processing circuit 408, temporarily stores image data output from the image signal processing circuit 408.

The display unit 413 receives image data output from the image signal processing circuit 408, converts the received image data into an image signal for display, and displays images according to the image signal for display on a display member, such as a liquid crystal display (LCD). The external I/F unit 415 is an interface which is used to communicate with external devices and connected to the image signal processing circuit 408. Therefore, image data output from the image signal processing circuit 408 can be transferred to external devices (e.g., PCs) through the external I/F unit 415.

A timing generating unit 409, which is connected to the image sensor 406 and the image signal processing circuit 408, supplies timing signals to the image sensor 406 and the image signal processing circuit 408. The image sensor 406 and the image signal processing circuit 408 each operate in synchronization with a supplied timing signal. An operation unit 417 receives predetermined commands from the user, and supplies the received commands to the overall control arithmetic unit 411. The predetermined commands include a command to change information about settings of the image sensing apparatus and a command to take a photo of an object, for example. The second memory unit 416 stores information about settings of the image sensing apparatus. The setting information of the image sensing apparatus includes exposure condition, zoom position, and drive mode.

The overall control arithmetic unit 411 controls each unit of the image sensing apparatus according to a command received from the operation unit 417. For instance, when receiving a command to change the setting information of the image sensing apparatus, the overall control arithmetic unit 411 accesses the second memory unit 416 and rewrites the image sensing apparatus's setting information stored in the second memory unit 416. To cite another example, when receiving a command to take a photo of an object, the overall control arithmetic unit 411 accesses the second memory unit 416, and according to the setting information of the image sensing apparatus stored in the second memory unit 416, controls each unit to execute a photographing operation.

A recording medium 414 is detachably connected to the recording medium control I/F unit 412. Thus, image data output from the image signal processing circuit 408 can be recorded on the recording medium 414 via the recording medium control I/F unit 412. Alternatively, image data recorded on the recording medium 414 can be supplied to the image signal processing circuit 408 via the recording medium control I/F unit 412. The recording medium 414 is, for example, a memory card, which includes a semiconductor memory.

Figure 2:
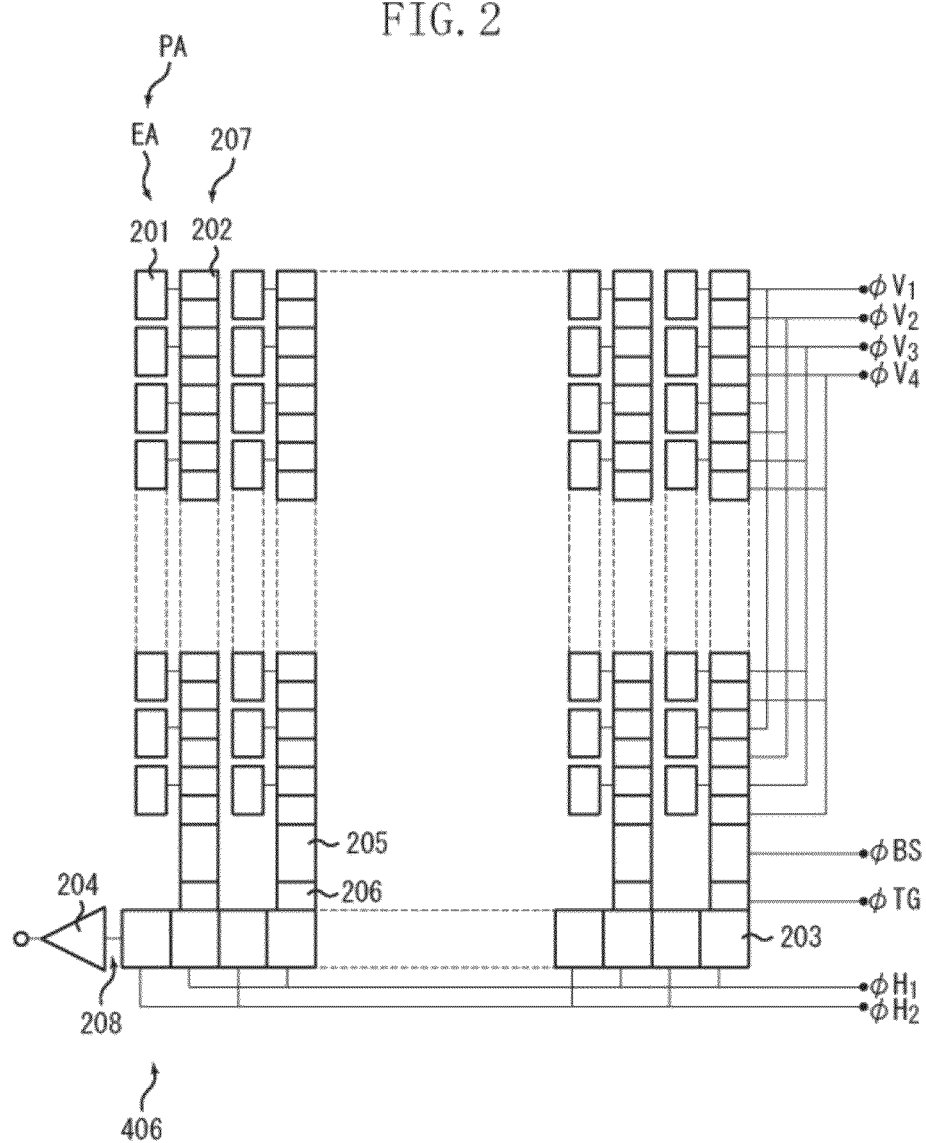
FIG. 2 illustrates a configuration of an image sensor.

FIG. 2 illustrates a configuration of the image sensor 406. The image sensor 406 includes a pixel array PA and a reading section 207. The pixel array PA has a plurality of pixels arranged in the row and column directions and includes effective areas EA and optical black (OB) areas. The OB areas are constantly shielded from incident light. Each pixel 201 includes a photoelectric conversion element and a color filter. The photoelectric conversion element stores electric charge generated according to incident light. The photoelectric conversion element is a photodiode, for example, which is formed such that a semiconductor area of a first conductivity type (P-type, for example) and a semiconductor area of a second conductivity type (N-type, for example) opposite to the first conductivity type surrounded by a well area of the first conductivity type.

When a defect is contained in the semiconductor area of a pixel 201 or in the area between the semiconductor area of the pixel 201 and the reading section 207, the image signal processing circuit 408 (FIG. 1) detects the pixel as a defective pixel based on a signal output from the pixel, which includes a photoelectric conversion element.

Each reading section 207 includes a vertical transfer unit 202, a horizontal transfer unit 203, a charge/voltage conversion unit 208, and an output unit 204. One vertical transfer unit 202 is, for example, a vertical transfer CCD, and includes a first gate electrode group, a second gate electrode, and a third gate electrode. The first gate electrode group is a group of electrodes configured to read signals from the pixel array PA and transfer them in the vertical direction. The second gate electrode is configured to hold the read signals in the buffer storage cell 205. The third gate electrode is configured to transfer a signal from the buffer storage cell 205 to the horizontal transfer unit 203.

According to a voltage (vertical transfer drive pulse φV1, φV2, φV3, φV4) supplied to the first gate electrode group, the vertical transfer unit 202 reads signals (electric charge) from the pixel array PA and transfers signals in the vertical direction towards the buffer storage cell 205. The vertical transfer unit 202 causes transferred signals (electric charge) to be temporarily stored in the buffer storage cell 205 according to a voltage (drive pulse φBS) supplied to the second gate electrode. Furthermore, the vertical transfer unit 202 transfers the signals (electric charge) stored in the buffer storage cell 205 to the horizontal transfer unit 203 according to a voltage (drive pulse φTG) supplied to the third gate electrode (transfer gate 206).

The horizontal transfer unit 203 is a horizontal transfer CCD, for example, and includes a fourth gate electrode group to transfer the signals transferred from the vertical transfer units 202 in the horizontal direction. The horizontal transfer unit 203 transfers signals, sent from the vertical transfer units 202, in the horizontal direction towards the charge/voltage conversion unit 208 according to a voltage (horizontal transfer drive pulses φH1, φH2) supplied to the fourth gate electrode group.

The charge/voltage conversion unit 208 is a floating diffusion unit, for example, and converts transferred charge into a voltage. The output unit 204 is an output amplifier, for example, and outputs a signal, which is generated according to a voltage from the charge/voltage conversion unit 208, to a signal line (not illustrated).

FIG. 3 illustrates an array of color filters, each color filter being included in one pixel 201. In each pixel 201 (FIG. 2), the color filters are disposed at positions above and perpendicularly to the photoelectric conversion elements. The color filters selectively transmit light wavelengths so that predetermined wavelengths (wavelengths of red (R), green (G), and blue (B)) enter the photoelectric conversion elements. A plurality of color filters in a plurality of pixels are arrayed in the row and column directions as illustrated in FIG. 3. FIG. 3 depicts a case where the first color filters transmit red (R) light, the second color filters transmit green (G) light, and the third color filters transmit blue (B) light. The array of those plural color filters is called the Bayer array, which is a color filter array that provides a particularly high resolution and excellent color reproducibility.

Figure 13:
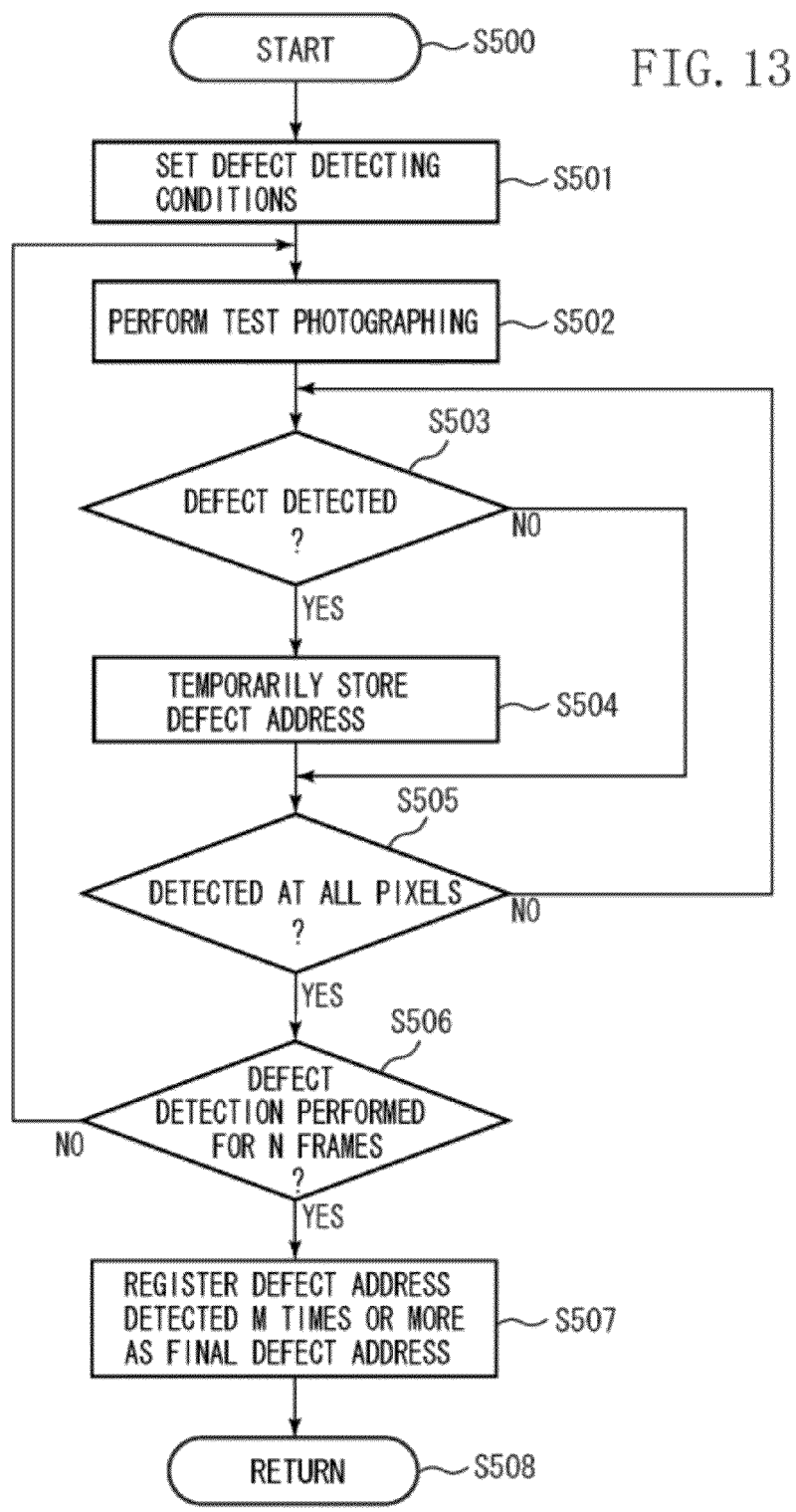
FIG. 13 is a flowchart illustrating a defect detection sequence in the image sensing apparatus.

FIG. 13 is a flowchart illustrating a defect detection sequence in the image sensing apparatus.

In step S500, if the overall control arithmetic unit 411 determines that defect detection should be started, the overall control arithmetic unit 411 starts a defect detection sequence. The overall control arithmetic unit 411 sets the operation mode to a defect detection mode M0.

In step S501, the overall control arithmetic unit 411 issues a command to the second drive unit 404 to cause the diaphragm 405 to close. Thus, the pixel array PA in the image sensor 406 is put into a light-shielded state. The overall control arithmetic unit 411 accesses the AFE 407 and sets the gain to a predetermined value G1. In other words, the overall control arithmetic unit 411 sets defect detecting conditions.

In step S502, the overall control arithmetic unit 411 controls the respective units to perform a test photographing operation. The test photographing operation is an operation to perform photographing by way of trial in order to acquire an image under light shielded condition.

As the overall control arithmetic unit 411 controls the image sensor 406 via the timing generating unit 409, each pixel 201 of the pixel array in the image sensor 406 accumulates electric charge for a predetermined accumulation time T.

Figure 14:
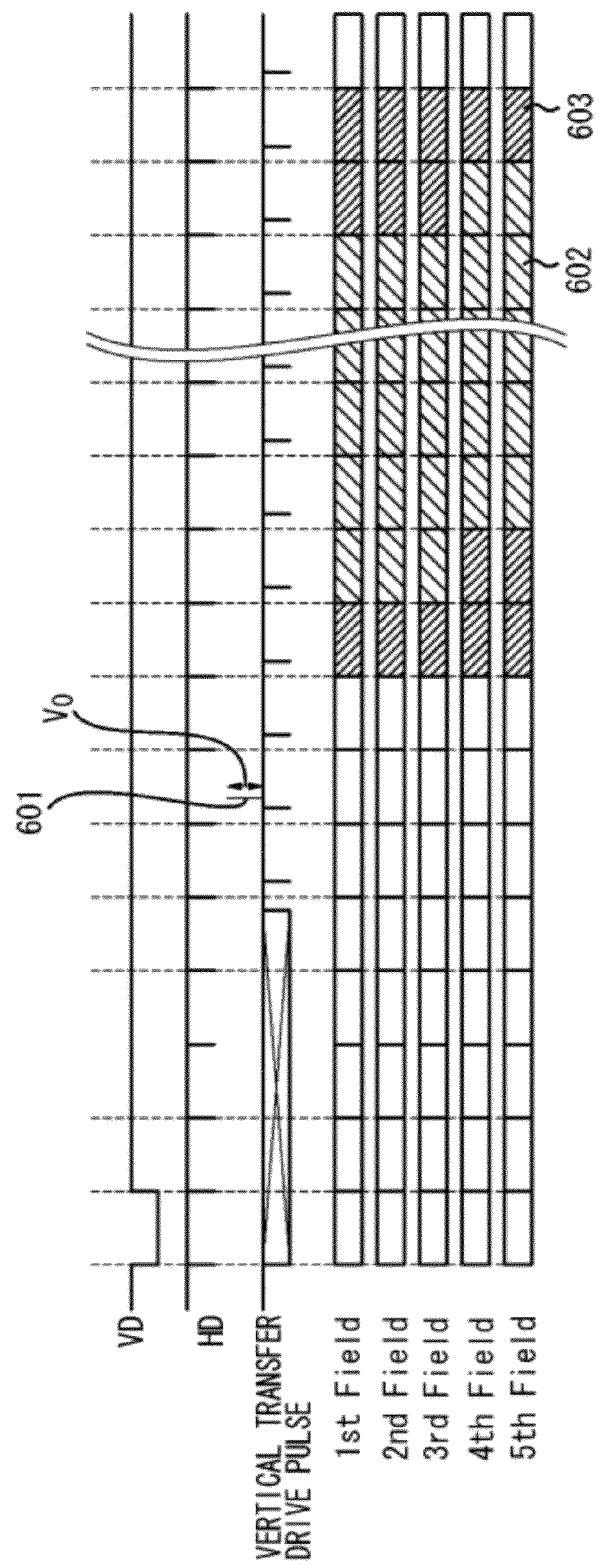
FIG. 14 is a timing chart illustrating an operation in a defect detection mode in the image sensing apparatus.

The reading section 207 (FIG. 2) reads signals (electric charge) from the pixel array PA according to a voltage (vertical transfer drive pulse) supplied to the first gate electrode group. For example, as illustrated in the timing chart in FIG. 14, in the reading section 207, a voltage 601 of V0 that is equal to a voltage supplied to the gate electrode during an ordinary object photographing mode is supplied only once to the first gate electrode group. Accordingly, the reading section 207 reads signals 602 from the effective area and also signals 603 from the pixels of the OB area in each frame period (first field to fifth field).

The image sensor 406 then generates and outputs light-shielded image signals based on read signals. The image signal processing circuit 408 receives the light-shielded image signals from the image sensor 406 via the AFE 407, and generates light-shielded image data based on the light-shielded image signals.

In step S503 in FIG. 13, the image signal processing circuit 408 selects as a target pixel a specific pixel in the pixel array PA, which has not yet been designated as a target pixel, and compares data at the target pixel in light-shielded image data with data at the surrounding pixels.

The image signal processing circuit 408 determines the target pixel to be defective if the signal level of the target pixel is higher, by a predetermined value Th0 or more, than an average value of signal levels of the surrounding pixels. If the signal level of the target pixel is not higher, by the predetermined value Th0 or more, than the average value of signal levels of the surrounding pixels, the image signal processing circuit 408 determines the target pixel to be defectless. If it is determined that the target pixel is defective (with a defect) (YES in step S503), the image signal processing circuit 408 advances the process to step S504. If it is determined that the target pixel is defectless (without a defect) (NO in step S503), the image signal processing circuit 408 advances the process to step S505.

In step S504, the image signal processing circuit 408 designates the address of the target pixel as a defect address, increments the number of times of defect detection of the target pixel by one, and temporarily stores the defect address and the number of times of defect detection in association with each other in the first memory unit 410.

In step S505, the image signal processing circuit 408 determines whether defect detection has been performed at all pixels of the pixel array PA. When determining that defect detection has been done at all the pixels (YES in step S505), the image signal processing circuit 408 advances the process to step S506. When determining that defect detection has not been done at all the pixels (NO in step S505), the image signal processing circuit 408 returns the process to step S503.

In step S506, the image signal processing circuit 408 determines whether defect detection has been done at the light-shielded image data for N frames (N is a positive integer) For example, if N is 10, the image signal processing circuit 408 determines whether defect detection has been performed on light-shielded image data for 10 frames. When determining that defect detection has been performed on light-shielded image data for N frames (YES in step S506), the image signal processing circuit 408 advances the process to step S507. When determining that defect detection has not been performed on light-shielded image data for N frames (NO in step S506), the image signal processing circuit 408 returns the process to step S502.

In step S507, the overall control arithmetic unit 411 acquires defect information including the defect address and the number of times of defect detection, which are associated with each other and temporarily stored in the first memory unit 410. For example, the overall control arithmetic unit 411 identifies a defect address, at which the number of times of defect detection in the acquired defect information is M or more (M is a positive integer equal to or smaller than N). For example, the overall control arithmetic unit 411 identifies a defect address, at which the number of times of defect detection in the defect information is two or more. The overall control arithmetic unit 411 stores (registers) the identified defect address as a final address in the second memory unit 416.

In step S508, when receiving a photographing command from the operation unit 417, the overall control arithmetic unit 411 controls the relevant units to perform a photographing operation. For example, the overall control arithmetic unit 411 controls the image signal processing circuit 408 to perform an interpolation process on image signals output from the image sensor 406. Therefore, the image signal processing circuit 408 acquires defect address information from the second memory unit 416, and corrects (interpolates) the signal of the pixel at the defect address in an image signal output from the image sensor 406 using signals of pixels adjacent to the pixel.

As has been described, in the defect detection sequence in FIG. 13, because image signals of a plurality of frames are acquired, a considerable time is required in a process of detecting pixels including flicker defects and correcting (interpolating) signals of those pixels (a defective pixel adjusting process). As a result, the takt time in the camera manufacturing process (the defective pixel adjusting process) may be prolonged and manufacturing cost may be increased.

Figure 4:
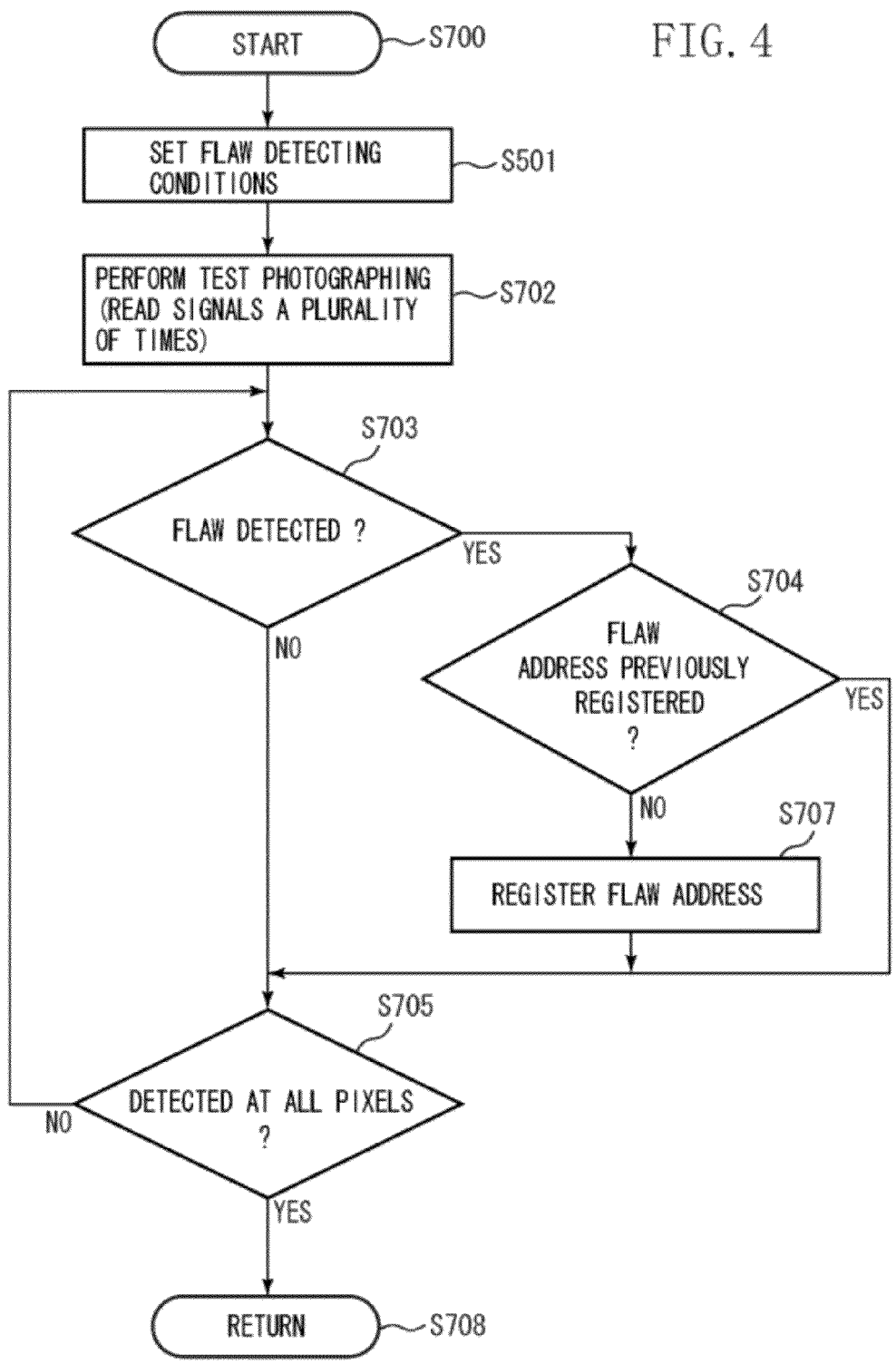
FIG. 4 is a flowchart illustrating a defect detection sequence in the image sensing apparatus according to a first exemplary embodiment of the present invention.

An image sensing apparatus according to a first exemplary embodiment of the present invention will be described below. The basic configuration of the image sensing apparatus according to the first exemplary embodiment is similar to the configuration illustrated in FIG. 1, but its operation (in a defect detection mode M1) is different from the operation (in a defect detection mode M0) illustrated in FIG. 13. In other words, the image sensing apparatus according to the first exemplary embodiment operates as illustrated in FIG. 4, which is different from the way it operates in FIG. 13 in the following respect. FIG. 4 is a flowchart illustrating a defect detection sequence in the image sensing apparatus according to the first exemplary embodiment.

In step S700, the overall control arithmetic unit 411 receives a power-on command via the operation unit 417. In response to the power-on command, the overall control arithmetic unit 411 puts respective units into active state. In step S501, the overall control arithmetic unit 411 sets the operation mode to the defect detection mode M1. In other words, the image sensing apparatus according to the first exemplary embodiment includes an automatic adjustment function to perform a defect detection process automatically when the power is turned on.

In step S702, the overall control arithmetic unit 411 controls respective units to perform a test photographing operation. As the overall control arithmetic unit 411 controls the image sensor 406 via the timing generating unit 409, each pixel 201 of the pixel array PA in the image sensor 406 accumulates electric charge for a predetermined accumulation time T.

Figure 5:
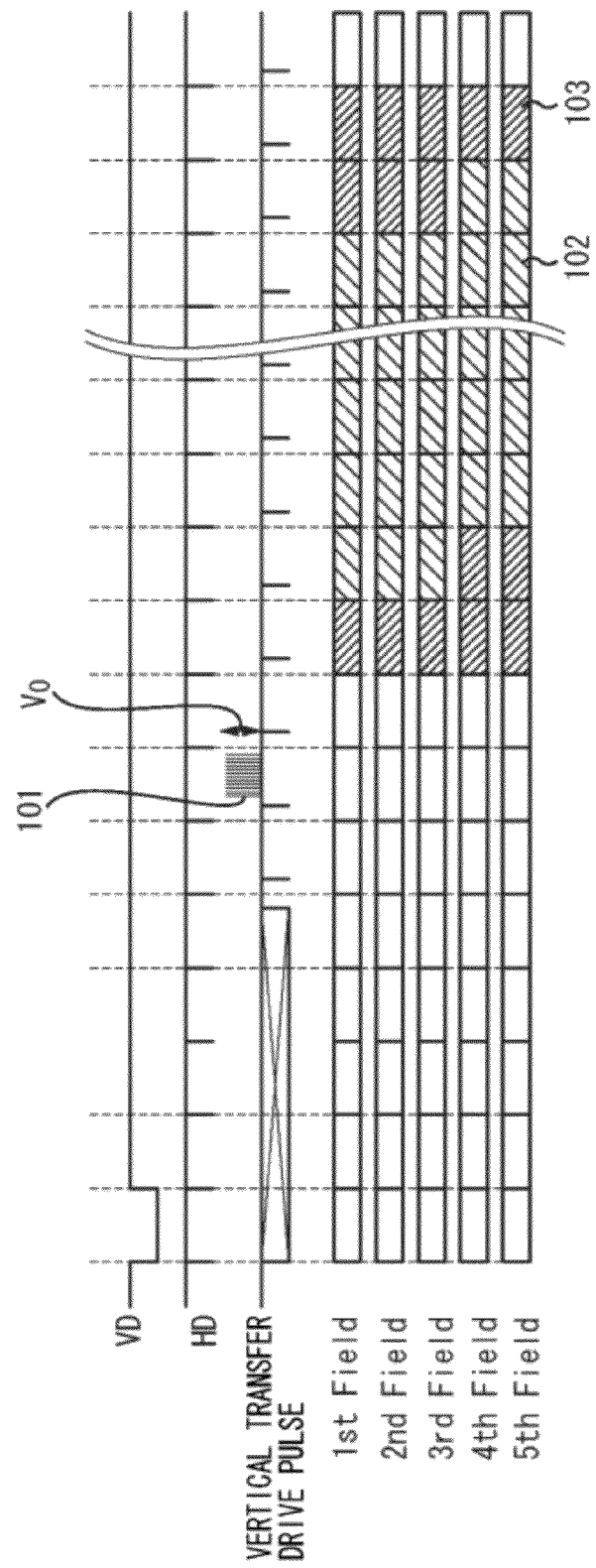
FIG. 5 is a timing chart illustrating an operation in a defect detection mode M1 in the image sensing apparatus.

Then, the reading section 207 (FIG. 2) reads a plurality of times a signal (electric charge) from the pixel array PA according to a voltage (vertical transfer drive pulse) supplied to the first gate electrode group. In other words, the reading section 207 reads signals from the pixel array PA under the condition that a defect tends to occur. For example, as illustrated in the timing chart of FIG. 5, in the reading section 207, a voltage 101 of V0 that is equal to a voltage supplied to the gate electrode during an ordinary object photography mode is supplied to the first gate electrode group a plurality of times. Accordingly, the reading section 207 reads signals 102 from the effective area and signals 103 from the pixels of the OB area in each frame period (first field to fifth field).

The image sensor 406 generates a light-shielded image signal based on the read signal and outputs the light-shielded image signal. The image signal processing circuit 408 receives the light-shielded image signal from the image sensor 406 via the AFE 407, and generates light-shielded image data based on the received light-shielded image signal.

In step S703, the image signal processing circuit 408 selects as a target pixel a specific pixel in the pixel array PA, which has not yet been designated as a target pixel, and compares data at the target pixel in light-shielded image data with data at the surrounding pixels.

The image signal processing circuit 408 determines the target pixel to be defective if the signal level of the target pixel is higher, by a predetermined value Th1 or more, than an average value of signal levels of the surrounding pixels. If the signal level of the target pixel is not higher, by the predetermined value Th1 or more, than the average value of signal levels of the surrounding pixels, the image signal processing circuit 408 determines the target pixel to be defectless. A detection section of the image signal processing circuit 408 detects defective pixels (defects) in the pixel array PA.

The predetermined value Th1 may be the same as or larger than the predetermined value Th0 in FIG. 13. This is because a possibility should preferably be taken into account that signals (electric charge) are added up in the vertical transfer unit 202 when a signal is read from the pixel array PA a plurality of times. If it is determined that the target pixel is defective (with a defect) (YES in step S703), the image signal processing circuit 408 advances the process to step S704. If it determined that the target pixel is defectless (without a defect) (NO in step S703), the image signal processing circuit 408 advances the process to step S705.

In step S704, the image signal processing circuit 408 supplies the overall control arithmetic unit 411 with the address of the target pixel as a defect address. The overall control arithmetic unit 411 accesses the second memory unit 416 and compares the supplied defect address with a previously detected defect address stored in the second memory unit 416. If a defect address that is the same as the supplied defect address has already been stored in the second memory unit 416 (YES in step S704), the overall control arithmetic unit 411 advances the process to step S705. If a defect address that is the same as the supplied defect address has not been stored in the second memory unit 416 (NO in step S704), the overall control arithmetic unit 411 advances the process to step S707.

In step S707, the overall control arithmetic unit 411 stores (registers) the supplied defect address as a final defect address in the second memory unit 416. In step S705, the image signal processing circuit 408 determines whether defect detection has been performed at all pixels in the pixel array PA. When determining that defect detection has been performed at all pixels (YES in step S705), the image signal processing circuit 408 terminates the process. If it is determined that defect detection has not been performed at all pixels (NO in step S705), the image signal processing circuit 408 returns the process to step S703.

In step S708, the overall control arithmetic circuit 411, upon receiving a photographing command via the operation unit 417, controls respective units to perform a photographing operation. For example, the overall control arithmetic unit 411 controls the image signal processing circuit 408 to perform an interpolation process on image signals output from the image sensor 406. Accordingly, the image signal processing circuit 408 acquires defect address information from the second memory unit 416, and corrects (interpolates) the signal of the pixel at the defect address in an image signal output from the image sensor 406 using signals of pixels adjacent to the pixel.

As has been described, in the present exemplary embodiment, the reading section of the image sensor reads a signal from the pixel array PA in one frame period a plurality of times in the defect detection mode M1. Thus, by using read pulses a plurality of times, an electric field is generated a plurality of times to serve as a trigger to release electrons trapped in the defects in the semiconductor areas of the pixels and in the areas between the pixels' semiconductor areas and the reading sections of the image sensor. In this manner, the occurrence probability of flicker defects in one frame period can be improved. Therefore, even when a flicker defect (flicker defect) is detected from image signals in one frame, the detection accuracy of pixels with flicker defects can be improved. Thus, according to the present exemplary embodiment, not only the detection accuracy of pixels with flicker defects can be improved but also the time required to detect pixels with flicker defects can be shortened.

Accordingly, since defects, including flicker defects, can be detected in a short detection time, even if automatic adjustment takes place when the camera is started, the deterioration of usability due to a prolonged waiting time at the start-up of the camera can be reduced to a minimum. Moreover, because defects including flicker defects can be detected with a single photographing operation, the frequency of automatic defect adjustment can be minimized.

More specifically, by adding a read pulse a plurality of times during defect detection, defects including flicker defects can be detected and interpolated with high accuracy without much increasing defect detection time. Consequently, the quality of images in digital cameras can be improved.

Next, an image sensing apparatus according to a second exemplary embodiment will be described with emphasis on their parts different from the first exemplary embodiment.

Figure 6:
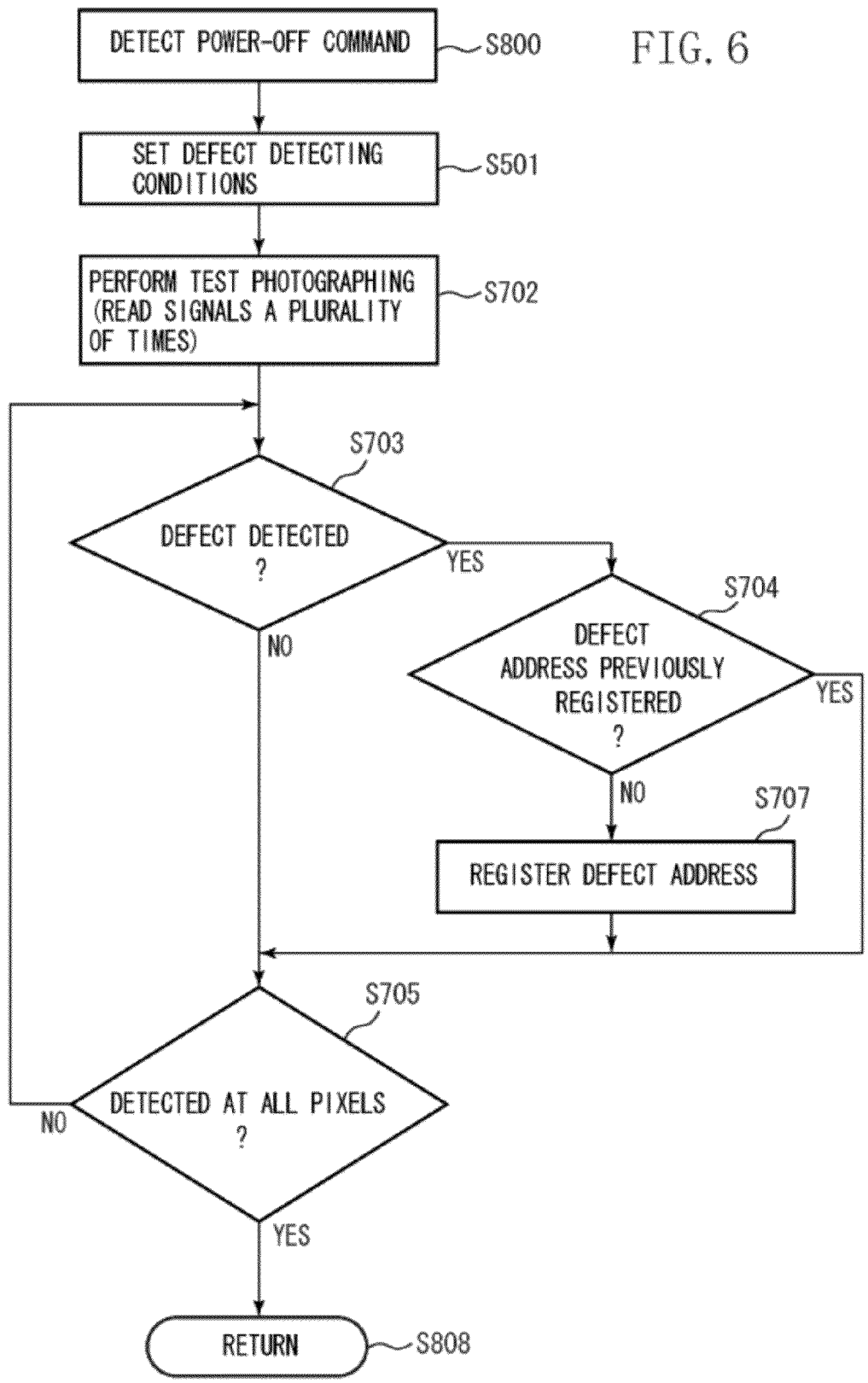
FIG. 6 is a flowchart illustrating a defect detection sequence in the image sensing apparatus according to a second exemplary embodiment of the present invention.

In the image sensing apparatus according to the second exemplary embodiment, while the basic configuration is similar to the configuration illustrated in FIG. 1, the operation (defect detection mode M1) is different from the operation (defect detection mode M0) illustrated in FIG. 13. In other words, as illustrated in FIG. 6, the image sensing apparatus according to the second exemplary embodiment operates differently from the operation depicted in FIG. 13 in the following respect. FIG. 6 is a flowchart illustrating the operation (defect detection sequence) of the image sensing apparatus according to the second exemplary embodiment.

In step S800, the overall control arithmetic unit 411 receives a power-off command via the operation unit 417. In step S501, the overall control arithmetic unit 411 sets the operation mode to the defect detection mode M1. In other words, the image sensing apparatus according to the second exemplary embodiment has the automatic adjustment function to perform an automatic defect detection process when the power is turned off.

In step S808, the overall control arithmetic unit 411 puts each unit into a non-active state in response to a power-off command. Thus, the overall control arithmetic unit 411 performs an ending operation.

In the present exemplary embodiment, since defects including flicker defects can be detected in a short time, even if automatic defect adjustment is performed when the power for the camera is turned off, the deterioration of usability caused by a long waiting time until the power is turned off can be minimized. Because defects including flicker defects can be detected with high accuracy, the frequency of automatic defect adjustment can be reduced to a minimum.

Figure 7:
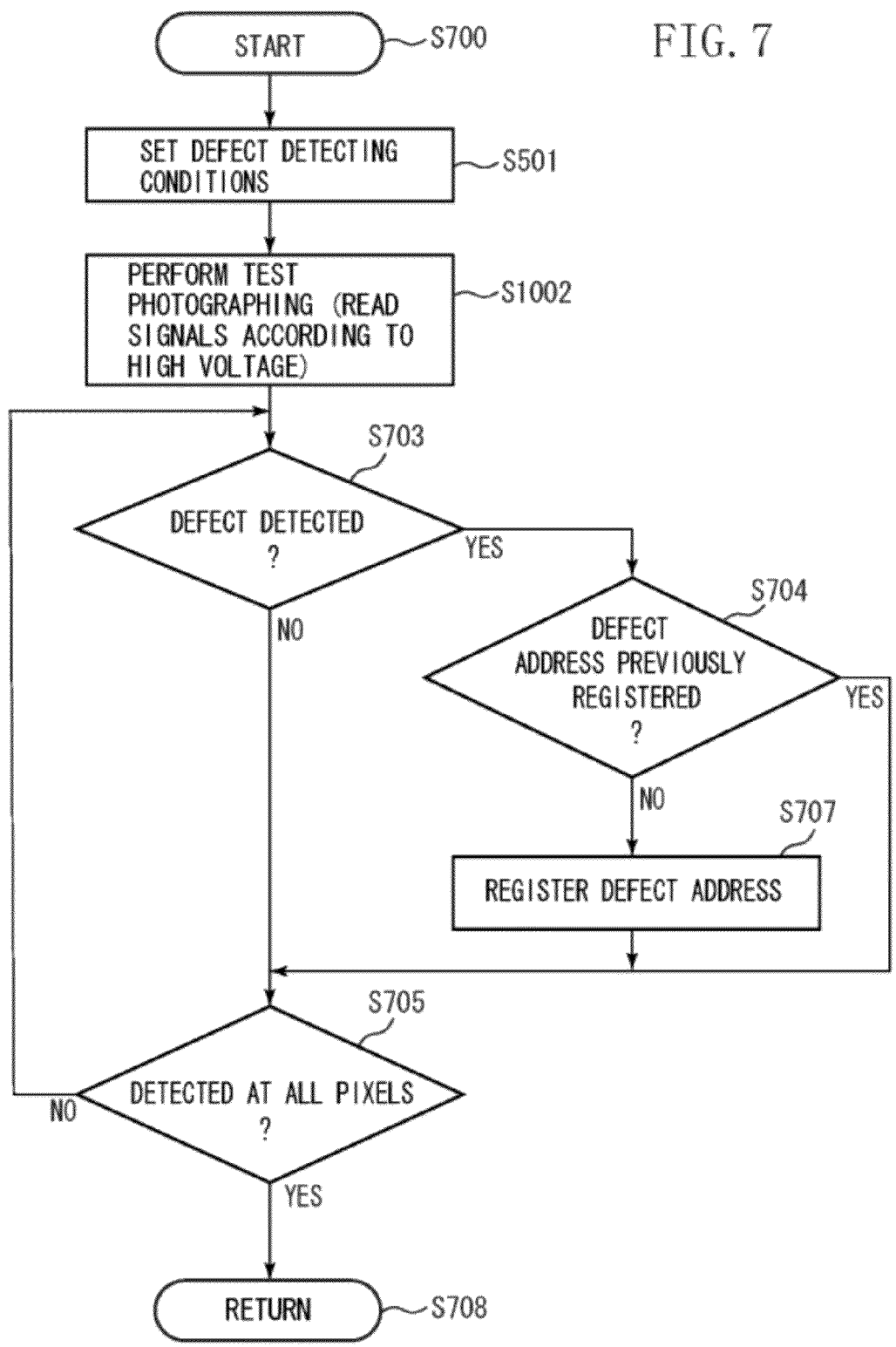
FIG. 7 is a flowchart illustrating a defect detection sequence in the image sensing apparatus according to a third exemplary embodiment of the present invention.

A third exemplary embodiment of the present invention will be described next centering around the parts different from those in the first exemplary embodiment. While the basic configuration of the image sensing apparatus according to the third exemplary embodiment is similar to the configuration illustrated in FIG. 1, its operation (in a defect detection mode M1) is different from the operation (in a defect detection mode M0) illustrated in FIG. 13. In other words, the image sensing apparatus according to the third exemplary embodiment operates as illustrated in FIG. 7, which is different from the way it operates in FIG. 13 in the following respect. FIG. 7 is a flowchart illustrating a defect detection sequence in the image sensing apparatus according to the third exemplary embodiment.

In step S1002, the overall control arithmetic unit 411 controls each unit to perform a test photographing operation. As the overall control arithmetic unit 411 controls the image sensor 406 via the timing generating unit 409, each pixel 201 of the pixel array PA in the image sensor 406 accumulates electric charge for a predetermined accumulation time T.

Figure 8:
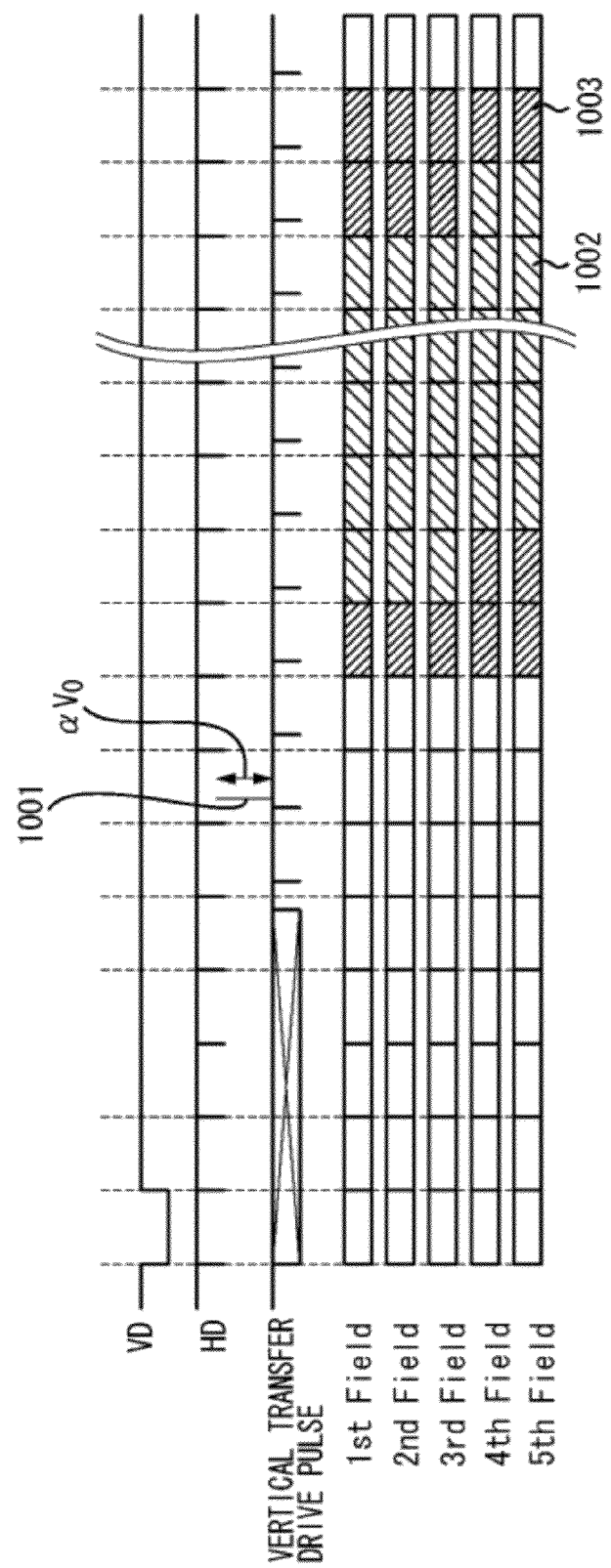
FIG. 8 is a timing chart illustrating an operation in a defect detection mode M2 in the image sensing apparatus.

The reading section 207 (FIG. 2) reads signals (electric charge) from the pixel array according to a voltage (vertical transfer drive pulse) supplied to the first gate electrode group. The voltage supplied to the first gate electrode group in the defect detection mode M2 is higher than a voltage supplied to the first gate electrode group in an ordinary object photographing mode. Thus, the reading section 207 reads signals from the pixel array PA under a condition that a defect tends to occur. For example, as illustrated in the timing chart in FIG. 8, at the reading section 207, a voltage 1001 of a voltage value $\alpha V0$ ($\alpha$>1) higher than a voltage supplied to the gate electrode group in the ordinary object photographing mode is supplied to the first gate electrode group. Accordingly, the reading section 207 reads signals 1002 from the effective areas and signals 1003 from the OB areas in each frame period (first field to fifth field).

The image sensor 406 generates a light-shielded image signal based on read signals and outputs the light-shielded image signal. The image signal processing circuit 408 receives the light-shielded signal from the image sensor 406 via the AFE 407 and generates light-shielded image data based on the light-shielded image signal.

In the present exemplary embodiment, a voltage higher than a voltage supplied in the ordinary object photographing mode is supplied to the first gate electrode group of the reading section in the image sensor in the defect detection mode M2. More specifically, by using a high-voltage read pulses, an electric field at a high value is generated to serve as a trigger to release electrons trapped in defects in the semiconductor areas of the pixels and in areas between the semiconductor areas of the pixels and the reading sections. In this manner, the occurrence probability of flicker defects in one frame period can be improved. Therefore, even when a flicker defect (flicker defect) is detected from image signals in one frame, the detection accuracy of pixels with flicker defects can be improved. In other words, according to the present exemplary embodiment, not only the detection accuracy of pixels with flicker defects can be improved but also the time required to detect pixels with flicker defects can be shortened.

Accordingly, since defects, including flicker defects, can be detected in a short detection time, even if automatic adjustment takes place when the camera is started, the deterioration of usability due to a prolonged waiting time at the start-up of the camera can be reduced to a minimum. Moreover, because defects including flicker defects can be detected with a single photographing operation, the frequency of automatic defect adjustment can be minimized.

Next, an image sensing apparatus according to a fourth exemplary embodiment will be described with emphasis on their parts different from the first exemplary embodiment.

In the image sensing apparatus according to the fourth exemplary embodiment, while the basic configuration is similar to the configuration illustrated in FIG. 1, the operation (defect detection mode M3) is different from the operation (defect detection mode M0) illustrated in FIG. 13.

Figure 9:
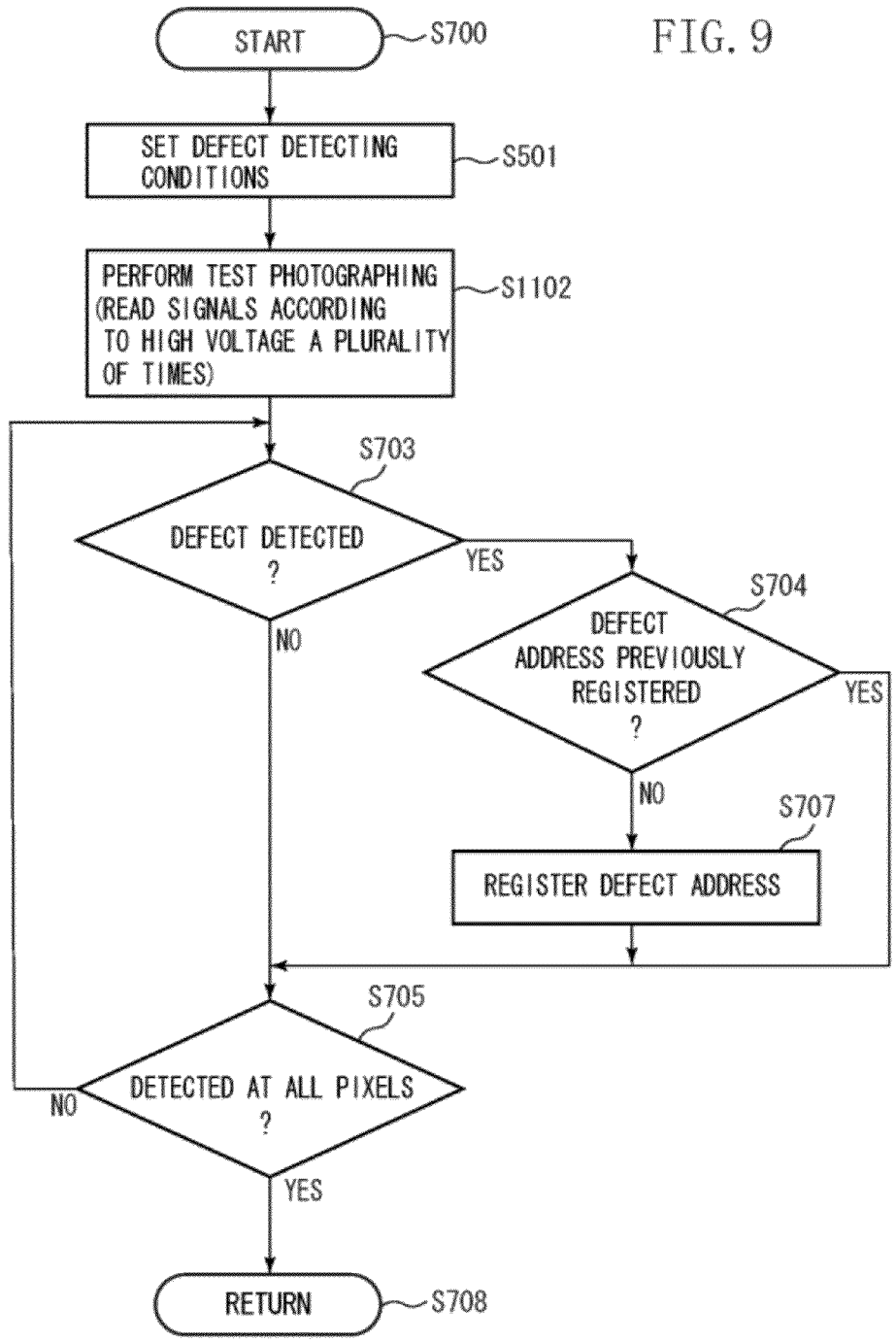
FIG. 9 is a flowchart illustrating a defect detection sequence in the image sensing apparatus according to a fourth exemplary embodiment of the present invention.

In other words, as illustrated in FIG. 9, the image sensing apparatus according to the fourth exemplary embodiment operates differently from the operation depicted in FIG. 13 in the following respect. FIG. 9 is a flowchart illustrating the defect detection sequence of the image sensing apparatus according to the fourth exemplary embodiment.

In step S1102, the overall control arithmetic unit 411 controls each unit to perform a test photographing operation. As the overall control arithmetic unit 411 controls the image sensor 406 via the timing generating unit 409, each pixel 201 of the pixel array PA in the image sensor 406 accumulates electric charge for a predetermined accumulation time T.

Figure 10:
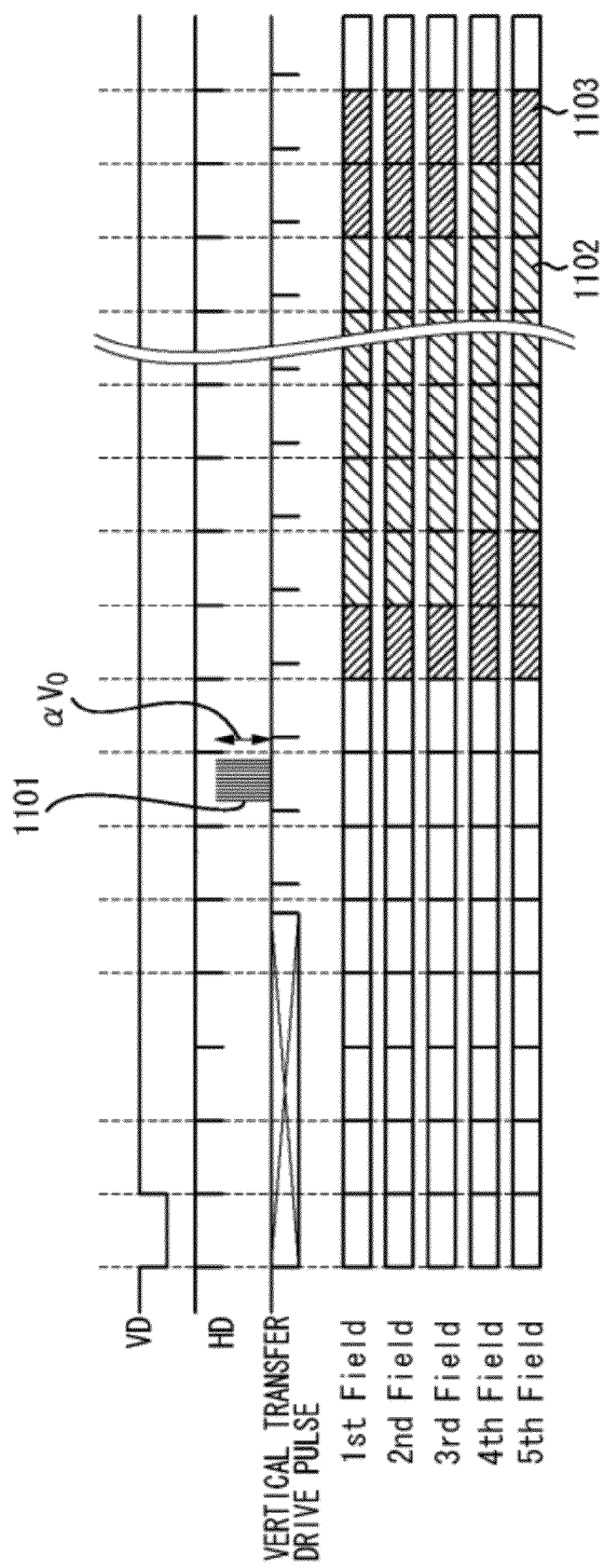
FIG. 10 is a timing chart illustrating an operation in a defect detection mode M3 in the image sensing apparatus.

Next, the reading section 207 (FIG. 2) reads signals (electric charge) from the pixel array PA according to a voltage (vertical transfer drive pulse) supplied to the first gate electrode group a plurality of times. The voltage supplied to the first gate electrode group in the defect detection mode M3 is higher than a voltage supplied to the first gate electrode group in the ordinary object photographing mode. For example, as illustrated in the timing chart in FIG. 10, at the reading section 207, a voltage 1101 of a voltage value $\alpha V0$ ($\alpha$>1) higher than a voltage supplied to the first gate electrode group in the ordinary object photographing mode is supplied to the first gate electrode group. Accordingly, the reading section 207 reads signals 1102 from the effective areas and signals 1103 from the OB areas in each frame period (first field to fifth field).

The image sensor 406 generates a light-shielded image signal based on the read signal and outputs the light-shielded image signal. The image signal processing circuit 408 receives the light-shielded image signal from the image sensor 406 via the AFE 407, and generates light-shielded image data based on a received light-shielded image signal.

In the present exemplary embodiment, the reading section in the image sensor reads signals from the pixel array PA a plurality of times in one frame period in the defect detection mode M3. A voltage higher than a voltage supplied in the ordinary object photographing mode is supplied to the first gate electrode group of the reading section in the image sensor in the defect detection mode M3. Thus, by using read pulses a plurality of times, an electric field at a high value is generated a plurality of times to serve as a trigger to release electrons trapped in the defects in the semiconductor areas of the pixels and in the areas between the pixels' semiconductor areas and the reading sections of the image sensor. In this manner, the occurrence probability of flicker defects in one frame period can be improved. Therefore, even when a flicker defect (flicker defect) is detected from image signals in one frame, the detection accuracy of pixels with flicker defects can be improved. Thus, according to the present exemplary embodiment, not only the detection accuracy of pixels with flicker defects can be improved but also the time required to detect pixels with flicker defects can be shortened.

Next, an image sensing apparatus according to a fifth exemplary embodiment will be described as follows.

Figure 11:
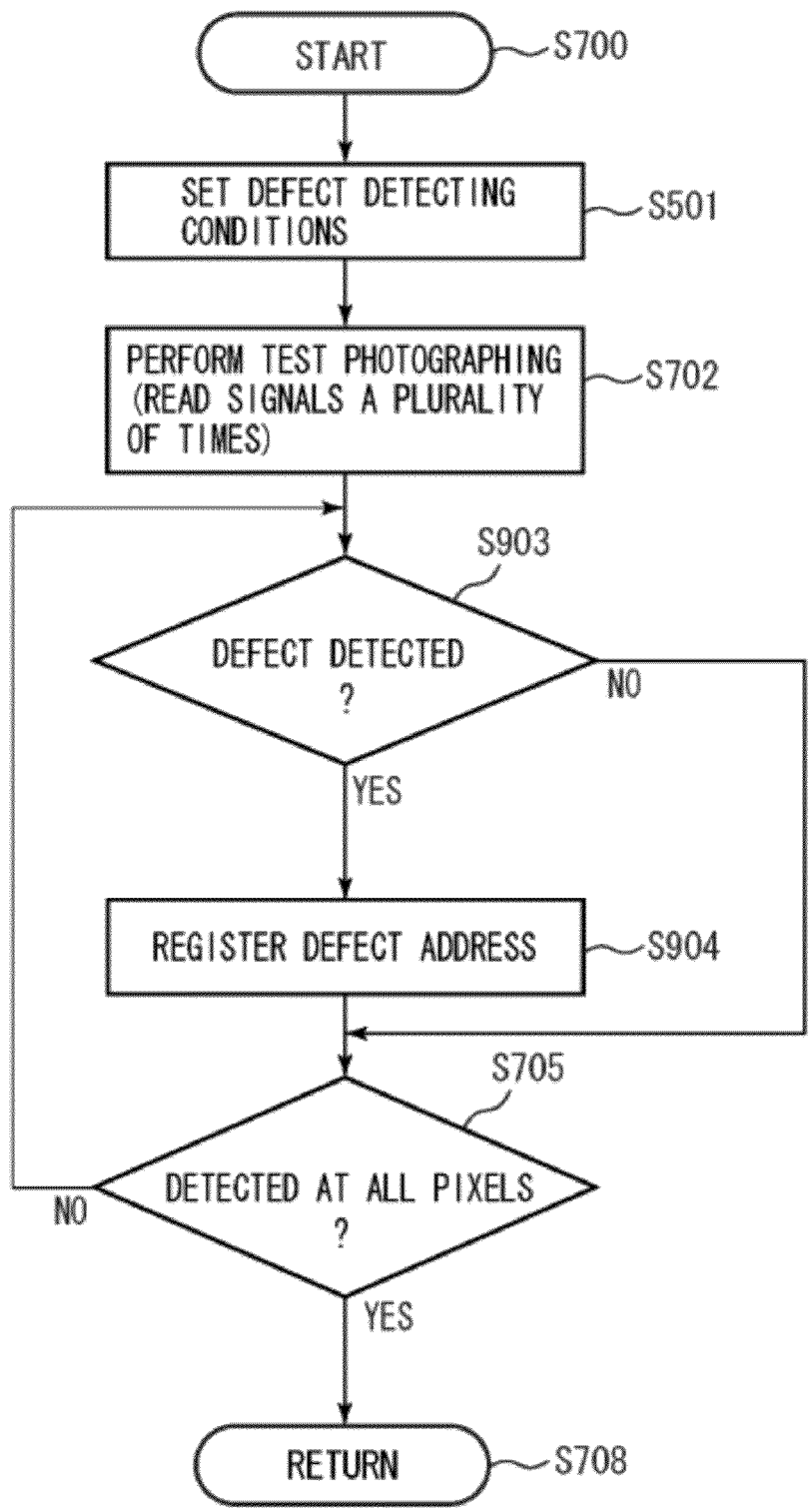
FIG. 11 is a flowchart illustrating a defect detection sequence in the image sensing apparatus according to a fifth exemplary embodiment of the present invention.

In the image sensing apparatus according to the fifth exemplary embodiment, while the basic configuration is similar to the configuration illustrated in FIG. 1, the operation (defect detection mode M4) is different from the operation (defect detection mode M0) illustrated in FIG. 13. In other words, as illustrated in FIG. 11, the image sensing apparatus according to the fifth exemplary embodiment operates differently from the operation depicted in FIG. 13 in the following respect. FIG. 11 is a flowchart illustrating the defect detection sequence of the image sensing apparatus according to the fifth exemplary embodiment.

In step S903, if the image signal processing circuit 408 determines a target pixel to be defective (with a defect) (YES in step S903), the image signal processing circuit 408 advances the process to step S904. If the image signal processing circuit 408 determines a target pixel to be defectless (without a defect) (NO in step S903), the image signal processing circuit 408 advances the process to step S705. The operation in step S903 is similar to that in step S703 in FIG. 4.

In step S904, the image signal processing circuit 408 supplies an address of the pixel having a defect as a defect address to the overall control arithmetic unit 411. The overall control arithmetic unit 411 stores (registers) the supplied defect address as a final defect address in the second memory unit 416.

As has been described, in the present exemplary embodiment, if the address of a target pixel is determined to be a defect address, this defect address is stored (registered) without taking trouble to find whether that address has been stored (registered) in the second memory unit. This further contributes to reducing time to detect a pixel with a flicker defect.

Accordingly, because defects, including flicker defects, can be detected in a further reduced detection time, the defect adjustment process in the camera production line can be extended. Consequently, defects, including flicker defects, can be detected and interpolated with high accuracy without increasing production cost.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-187909 filed Jul. 18, 2008, which is hereby incorporated by reference herein in its entirety.

What is claimed is:

1. An image sensing apparatus comprising:
   an image sensor including a pixel array, on which a plurality of pixels are arranged, and a reading section configured to read a signal from the pixel array;
   a detection unit configured to detect a defective pixel in the pixel array based on a signal read from the pixel array by the reading section under a condition that the pixel array is shielded from light; and
   a control unit configured to control the reading section to read a signal from the pixel array under a condition that a defect tends to occur when the detection unit detects the defective pixel,
   wherein the reading section includes gate electrodes used to read signals from the pixel array, and
   wherein, when the detection unit detects the defective pixel, the control unit supplies, to the gate electrodes, a voltage higher than a voltage supplied when ordinary photographing is performed.

2. The image sensing apparatus according to claim 1, further comprising a correction unit configured to correct a signal from the defective pixel detected by the detection unit using a signal from a pixel adjacent to the defective pixel.

3. The image sensing apparatus according to claim 1, wherein the control unit controls the reading section to read a signal from the pixel array a plurality of times in one frame period when the detection unit detects the defective pixel.

4. A method for controlling an image sensing apparatus including an image sensor including a pixel array, on which a plurality of pixels are arranged, and a reading section configured to read a signal from the pixel array, and a detection unit configured to detect a defective pixel in the pixel array based on a signal read from the pixel array by the reading section under a condition that the pixel array is shielded from light, the method comprising:
   controlling the reading section to read a signal from the pixel array under a condition that a defect tends to occur when the detection unit detects the defective pixel,
   wherein the reading section includes gate electrodes used to read signals from the pixel array, and
   wherein the method further comprises, when the detection unit detects the defective pixel, supplying, to the gate electrodes, a voltage higher than a voltage supplied when ordinary photographing is performed.

5. The method according to claim 4, further comprising correcting a signal from the defective pixel detected by the detection unit using a signal from a pixel adjacent to the defective pixel.

6. The method according to claim 4, further comprising controlling the reading section to read a signal from the pixel array a plurality of times in one frame period when the detection unit detects the defective pixel.

* * * * *